March 8, 1960 T. T. LUNDE 2,927,550
MECHANISM FOR OPERATING DUMP-GATES ON BOTTOM-DUMP BARGES
Filed Aug. 20, 1958 3 Sheets-Sheet 1
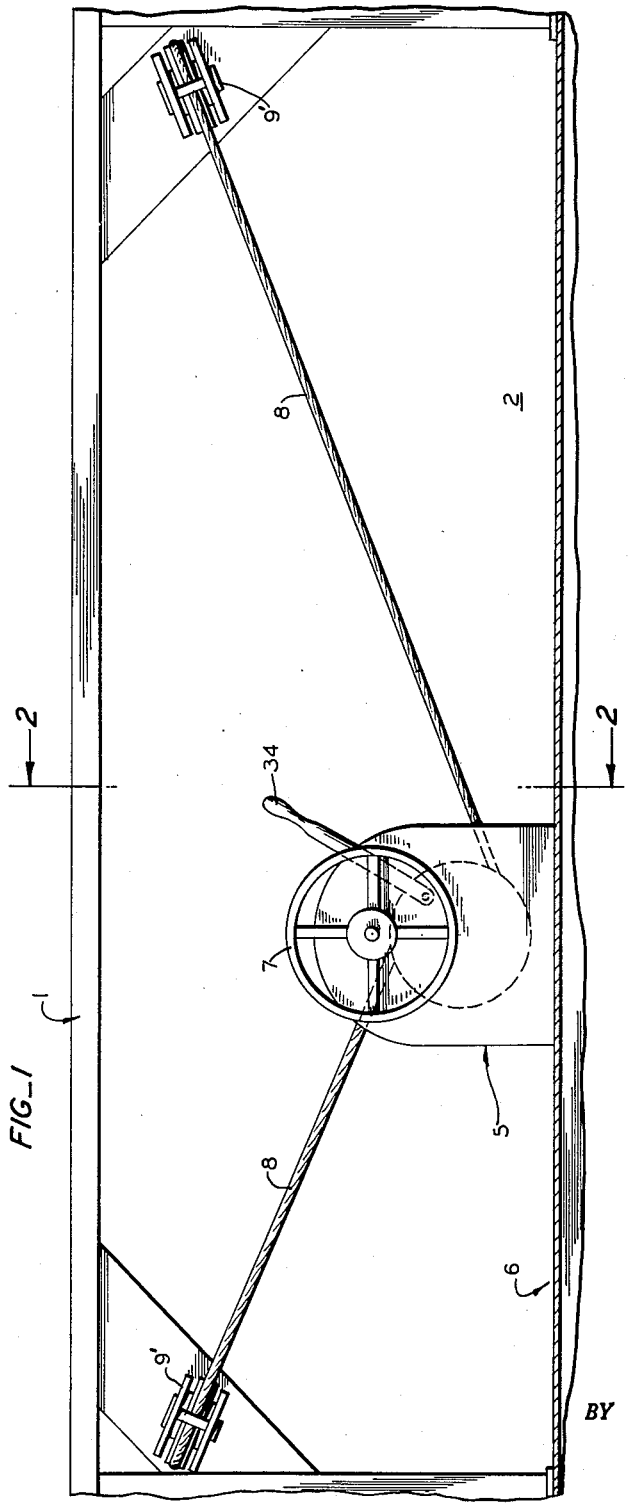
INVENTOR.
THOMAS T. LUNDE
BY
ATTORNEY

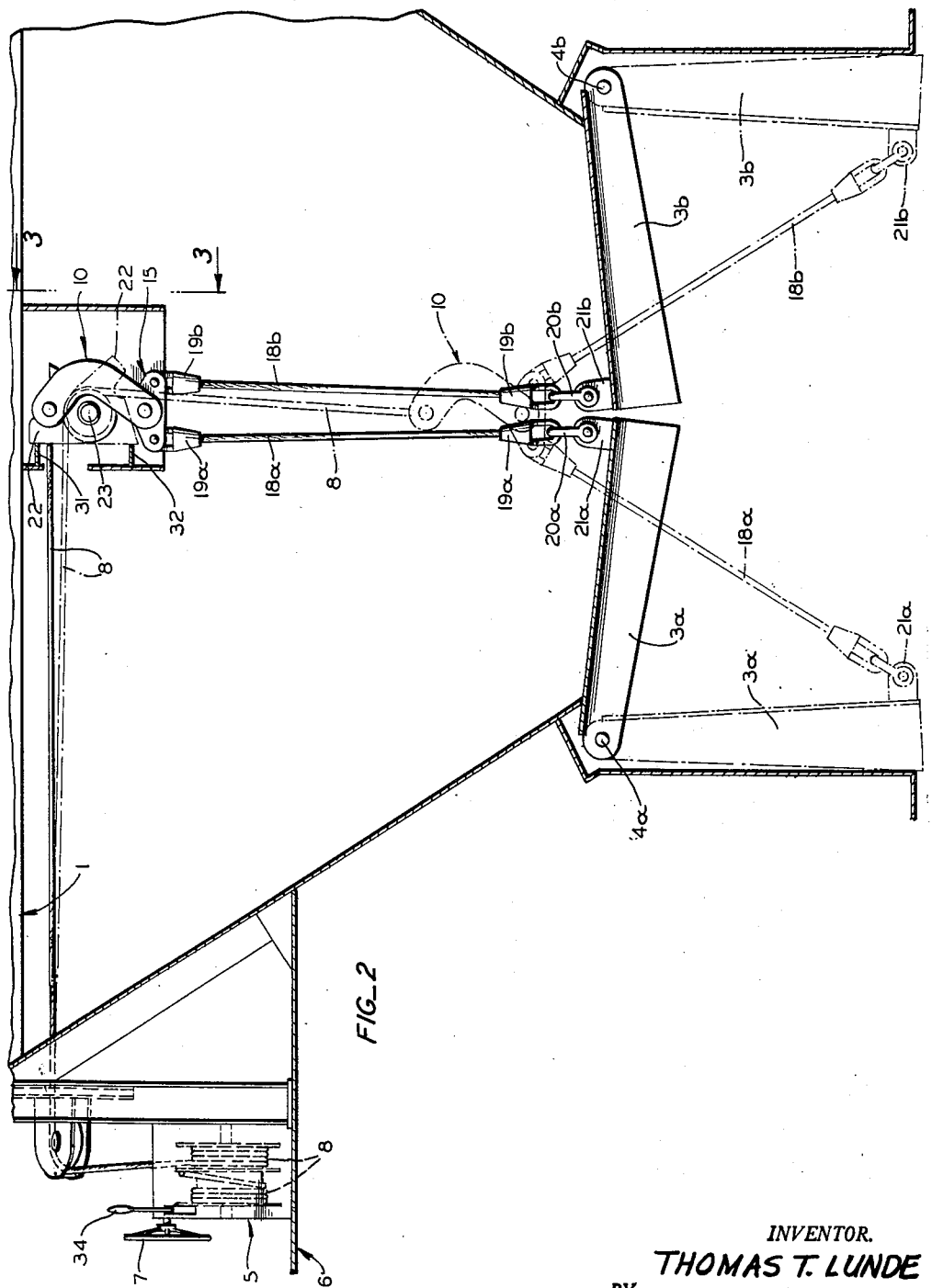

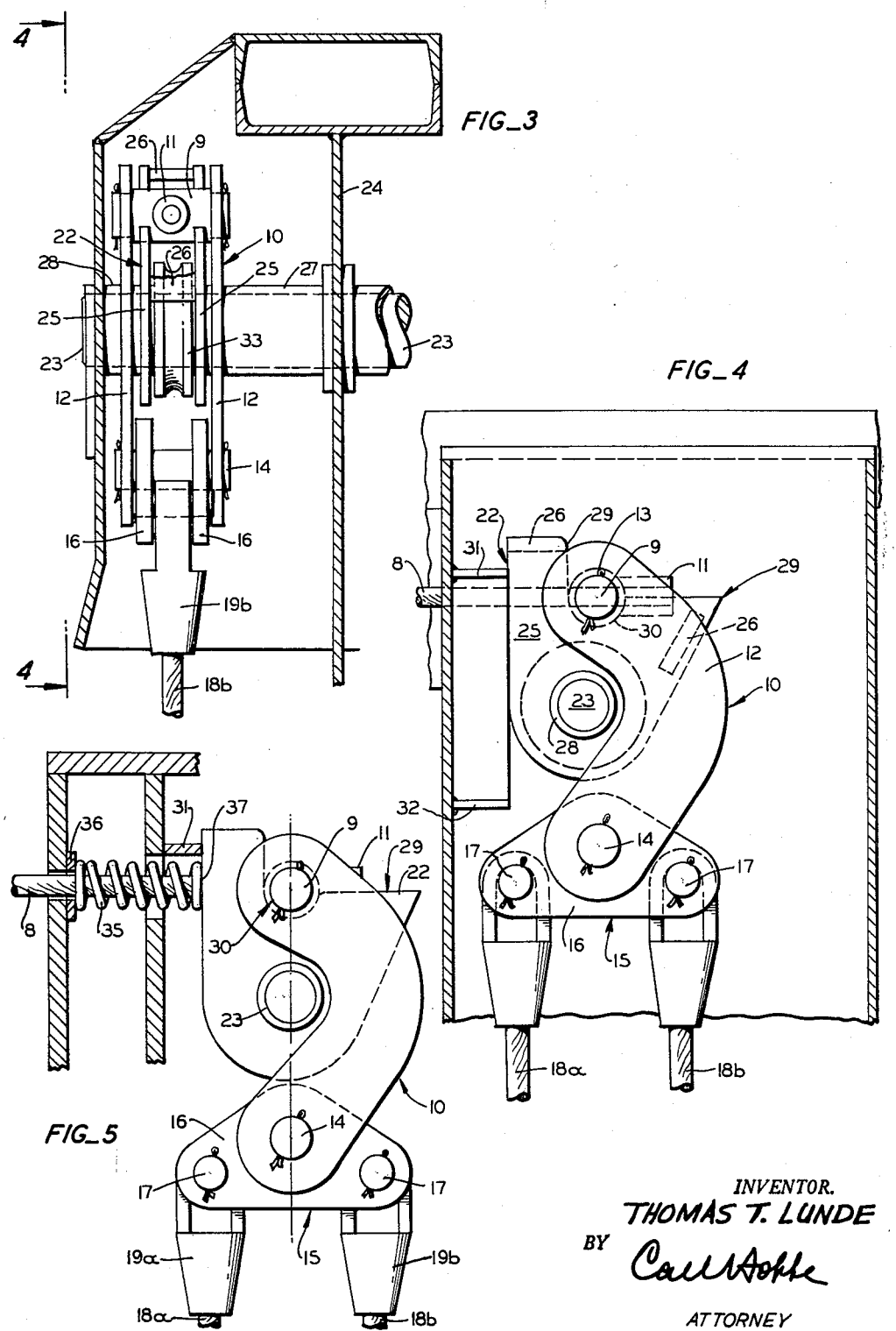

United States Patent Office 2,927,550
Patented Mar. 8, 1960

2,927,550
MECHANISM FOR OPERATING DUMP-GATES ON BOTTOM-DUMP BARGES

Thomas T. Lunde, San Francisco, Calif.

Application August 20, 1958, Serial No. 756,198

5 Claims. (Cl. 114—36)

This invention relates generally to mechanisms for operating dump-gates on bottom-dump barges and more particularly relates to a winch and cable mechanism featuring an improved latching means adapted to operate free-fall type dump-gates.

Bottom-dump barges generally comprise a series of cargo hoppers or compartments each provided with one or more pairs of dump-gates forming the bottom of such hopper or compartment through which the lading may be dumped. These dump-gates are commonly of the free-fall type arranged to pivot open by reason of the weight of the gates themselves plus the weight of the lading resting upon them.

Heretofore, the apparatus used for operating these dump-gates consisted of a very large steel shaft, about 6 to 10 inches in diameter, running the full length of the cargo hoppers. This shaft functioned as a spool upon which were wound large chains attached to each of the dump-gates. To close the gates the shaft was rotated by means of a ratchet and pawl arrangement so as to wrap the chains thereon and pivot the dump-gates to their closed position. The shaft and dump-gates were secured in this closed position by dogs mounted on the barge deck which restrained the shaft from rotating. Dumping was performed by knocking these dogs out of position with a wedge and sledge hammer, whereupon the weight of the dump-gates and the lading resting upon them caused the gates to pivot open and to unwrap the chains from the shaft. This procedure required considerable force and was very dangerous, frequently resulting in severe injuries to operating personnel. Moreover, it was necessary to design the entire operating mechanism to withstand not only the weight of the gates themselves but also the tremendous weight of the cargo resting upon them. This resulting in both a heavy and a bulky apparatus.

Primarily the present invention includes a winch and cable means for closing the dump-gates after the gates have free-fallen open to discharge the lading, an improved latching device for securing the dump-gates in the closed position, and means for releasing the latching device by the application of a nominal manual force.

One object of the present invention is to provide a dump-gate operating mechanism for bottom-dump barges which requires only a nominal force to operate and is inherently safe with respect to operating personnel.

Another object of this invention is to provide a dump-gate operating mechanism designed so that only a small portion thereof is subjected to the dump-gate and cargo weight resulting in a compact and light-weight mechanism.

The foregoing and numerous other objects and advantages of this mechanism will be more apparent from the following detailed description when considered in connection with the accompanying drawings wherein:

Fig. 1 is a partial end elevational view of a dump-gate mechanism embodying features of the present invention;

Fig. 2 is a partial transverse sectional view of a typical bottom-dump barge taken along line 2—2 of Fig. 1, illustrating in side elevation the dump-gate mechanism;

Fig. 3 is a detailed end view of the improved latching means taken along line 3—3 in Fig. 2;

Fig. 4 is a detailed side elevational view of the latching means taken along line 4—4 of Fig. 3; and Fig. 5 is a detailed side elevational view of a modification of the latching means including a spring arrangement for moving the latching means off top dead-center.

Referring now more specifically to the drawings wherein like numerals are employed to designate similar parts throughout the various figures, a typical bottom-dump barge, referred to generally as 1, is illustrated in Figs. 1 and 2. One of the barge cargo hoppers 2 is shown provided with a pair of dump-gates 3a and 3b each pivoted from the barge frame as at 4a and 4b, respectively. The dump-gates are indicated by solid lines in their closed position and are of the free-fall type so that when the mechanism operating them is unlatched the gates free-fall open to the position indicated by dotted lines in Fig. 2. The weight of the gates themselves and the weight of the lading resting upon them cause the gates 3a and 3b to rotate to an open position about their respective pivots 4a and 4b.

The dump-gates are raised to the closed position after the lading has been discharged by a separate winch and wire rope assembly for each cargo hopper or compartment. Such an assembly illustrated in Fig. 1 includes a hand operated winch 5 mounted on the barge deck 6. A power winch may also be used. However, the winch illustrated herein is a 15 ton Beebe hand hoist with a hand wheel 7. The rope drum of the winch 5 is modified to hold two cam ropes 8 made of wire rope or cable. Each cam rope 8 extends around a separate sheave 9', mounted on the barge frame and each is connected by a separate latch and bridle assembly to the opposite ends of the dump-gates 3a and 3b. Each hopper on the barge is provided with a similar winch and cable assembly to operate its dump-gates.

Each of the cam ropes 8 is affixed at its free end to a pin 9 forming a part of link 10. The cam rope 8 passes through a transverse hole drilled in the pin 9 and is affixed to the pin by means of a rope socket 11. The link 10, as is more clearly illustrated in Figs. 3 and 4, consists of the pin 9 pivotally mounted on a pair of arcuate plates 12 which abut a shoulder on the pin 9 and are held in place by cotter pins 13, and a straight pin 14 also pivotally mounted on the plates 12 and similarly secured with cotter pins.

On the straight pin 14 is pivoted a wobble plate 15 consisting of a pair of steel plates 16 and two straight pins 17 pivotally mounted thereon and secured with cotter pins. Wire rope bridles 18a and 18b, depend from each of the pins 17 and are connected to the pins by means of closed rope sockets 19a and 19b, respectively, fitted to the upper ends of the bridles 18a and 18b. As will be observed in Fig. 2 the lower ends of bridles 18a and 18b are pivotally connected by means of chain shackles 20a and 20b, respectively, to ears 21a and 21b provided on the inner edge of the dump-gates 3a and 3b. Similar link 10, wobble plate 15, and bridle assemblies are interconnected to each cam rope 8 and to each end of the dump-gates 3a and 3b.

A distinguishing feature of the present invention is the latching means for each cam rope 8 comprising the aforesaid link 10 and a guide plate 22 pivoted on pin 23. The pin 23 is rigidly affixed and supported from the barge bulkhead 24 as illustrated in Fig. 3. The guide plate 22 includes two identically shaped plates 25 each welded to two spacers 26 and welded to sleeve spacers 27 and 28 which fit over the pin 23 and position the guide plate 22 with respect to the bulkhead 24 and the link 10. Thus the guide plate 22 may be rotated on the sleeves 27 and 28 about the pin 23. Sufficient clearance between the rotating surfaces is provided for proper lubrication.

The guide plate 22 is provided with cam surfaces 29 and a detent 30. The detent 30 engages the pin 9 as illustrated in Figs. 2 and 4 when the dump-gates 3a and 3b are in their closed position. The detent 30 is located so that when the guide plate 22 is in the latched position abutting guide stop 31, the center of the pin 9 is offset to the right from the vertical centerline passing through the center of the pin 23, as illustrated in Fig. 4. The weight of the closed dump-gates and the lading resting upon them acts vertically through the pin 9 and because of the eccentricity of the centers of the pin 9 and the pin 23 creates an opening torque tending to rotate the guide plate 22 clockwise about the pin 23. The guide plate 22 is secured in the latched position by tension in the cam rope 8 developed by manipulating the winch 5, thereby creating a closing torque about pin 23 opposing the aforesaid opening torque. It will be observed that the respective moment arms of these opening and closing torques are such that only a small tension force need be developed in the cam rope 8 to oppose the considerably greater weight of the dump-gates 3a and 3b and the lading resting upon them. By controlling the amount of eccentricity of the detent 30 with respect to the center of the pin 23 the cam rope tension necessary to hold the latch in the closed position may be varied as desired.

The mechanism is unlatched by reducing the tension of the cam rope 8 and hence reducing the closing torque on the guide plate 22 to the point where it can no longer overcome the opening torque developed by the weight of the dump-gates and lading. The unbalanced opening torque causes the guide plate 22 to rotate on the pin 23 to the position indicated by dotted lines in Fig. 2 whereupon the pin 9 is disengaged from the detent 30. The mechanism, then being unrestrained, continues through the opening motion. Further movement of the guide plate 22 is prevented by a second guide stop 32.

As the guide plate 22 rotates about the pin 23 the cam rope 8 is positioned on a sheave 33 also pivotally mounted on the pin 23 and between the two shaped plates 25 of the guide plate 22. The cam rope 8 rides on the sheave 33 through the remainder of the opening and closing motion until the pin 9 again engages the detent 30 and rotates into the latched position.

Any type of hand or power winch 5 may be used; however as illustrated in Figs. 1 and 2 the applicant prefers to use a type of winch which permits the dump-gates to free-fall open without any braking whatsoever. A preferred type of winch is more fully described in copending application Serial No. 757,014, filed August 25, 1958. The winch is provided with a release lever 34. Application of a nominal force to the release lever 34 by an operator allows the winch drum to run free and rotate in response to any tension in the cam ropes 8.

In this manner the closing torque imposed on the latch is released permitting the entire operating mechanism to move through the opening motion. The opening torque on the latch developed by the weight of the dump-gates and lading, is now unopposed and causes the cam rope 8 to unwind from the winch 5 whereupon the dump-gates begin to open. The guide plate 22 then pivots about the pin 23 until it abuts guide stop 32 as shown in dotted lines in Fig. 2. At this point as described hereinabove the pin 9 disengages itself from the detent 30, the cam rope 8 rides in the sheave 33, and the dump-gates 3a and 3b free-fall open thus discharging the lading out of the bottom of the cargo hoppers.

The dump-gates are closed by manipulation of the winch hand wheel 7, winding up the cam ropes 8 on the winch drum. It will be observed in Fig. 2, that as the link 10 is raised the pin 9 engages the detent 30 or contacts the cam surfaces 29 adjacent thereto which direct the pin 9 into engagement with the detent 30. Further manipulation of the winch hand wheel 7 and the resultant tensioning of the cam rope 8 cause the pin 9 to rotate the guide plate 22 about the pin 23 until it abuts the guide stop 31 and is again in the latched position shown in Fig. 2 and Fig. 4. Then, any further movement of the hand wheel 7 serves to tension the cam rope 8 and thereby further secures the latch mechanism. The tension in the cam rope 8 is maintained by suitable pawls or brakes on the winch preventing any reverse rotation of the winch drum.

Depending upon the amount of eccentricity between the detent 30 and the center of the pin 23, the weight of the dump-gates and the lading acting through the pin 9 is supported entirely or almost entirely by the pin 23. This design permits the use of a lighter winch and lighter cam ropes than would be possible if they were statically designed to support the full dump-gate and lading weight. The winch and cam ropes need be designed only to handle as a traveling load, the necessary closing forces consisting principally of the dump-gate weight. The winch and cam ropes need be designed for a static load equal to the rope tension necessary to secure the latch.

The amount of eccentricity, of course, may vary from nothing at all to a substantial amount. In the former case the entire dump-gate and lading weight is supported by the pin 23, and in the latter case a portion of such weight must be resisted by the winch and its associated cam ropes. A modified embodiment of this invention is illustrated in Fig. 5 wherein the eccentricity between the detent 30 and the pin 23 is reduced to nothing; that is, in the latched position the centers of the detent and pin 23 lie in the same vertical plane. A coil spring 35 is added to the device to provide a means for moving the pin 9 and the guide plate 22 off top dead-center when the latching means is to be unlatched. This spring 35 is fastened to and bears against a fixed spring seat 36 mounted on the barge through which the cam rope 8 passes. These elements are positioned so that when the guide plate 22 is in its latched position abutting the guide stop 31, the spring 35 is compressed and exerts a force against the guide plate 22 as at 37 against which it also bears. The tension in the cam rope 8 developed to secure the latch in the closed position maintains the spring 35 under compression. When this tension in the cam rope is released by manipulation of the release lever 34, the spring 35 seeks to regain its free length thereby pushing the guide plate 22 off top dead-center whence the mechanism continues through the opening motion motivated by the dump-gate and lading weight as described hereinabove.

While specific structural features have been disclosed herein, various modifications and changes may be obvious to those skilled in this art without departing from the scope of this invention; therefore, the invention is not to be construed as being limited to the illustrative embodiment disclosed herein but is defined by the appended claims.

I claim:

1. In an apparatus having support means, a shaft carried by said support means, a rotatable pulley mounted on said shaft, and tension means trained over said pulley and having a fall and a hauling part, an improved latch means comprising in combination a swingingly reciprocable member pivoted on said shaft and provided with a detent and an adjacent guide surface; a link means having an upper and a lower end, the upper end being attached to the hauling part of said tension means and the lower end being secured to a load; a pin extending through said upper end of said link means and mating with the guide surface and detent of said reciprocable member; and stop means located on said support means and limiting the movement of said reciprocable member to swingingly reciprocatory motion with said detent at its extreme positions opening downwardly and upwardly, respectively, on the same side of a vertical centerline passing through said shaft.

2. In an apparatus having support means, a shaft carried by said support means, a rotatable pulley mounted on said shaft, and a cable trained over said pulley and having a fall and a hauling part, an improved latch means comprising in combination a swingingly reciprocable member pivoted on said shaft and provided with a detent and an adjacent guide surface both opening radially outwardly from said shaft; an arcuate link means having an upper and a lower end, the upper end being attached to the hauling part of said cable and the lower end being secured to a load; a pin extending through said upper end of said arcuate link means and mating with the guide surface and detent of said reciprocable member; and stop means located on said support means and limiting the movement of said reciprocable member to a swingingly reciprocatory motion with said detent at its extreme positions opening downwardly and upwardly, respectively, on the same side of a vertical centerline passing through said shaft.

3. In an apparatus for operating a pair of dump-gates on a bottom-dump barge or the like having a bridle assembly connected to said dump-gates terminating in a first pin, winch means mounted on said barge, a cable interconnecting said first pin and said winch means, a second pin mounted horizontally on said barge, a guide sheave pivoted on said second pin over which said cable trains, depending therefrom to said first pin, an improved latch assembly for holding said dump-gates closed comprising in combination a swingingly reciprocable guide plate pivoted on said second pin straddling said guide sheave and having a detent opening radially outwardly from said second pin and aligned for operatively engaging said first pin; and stop means mounted on said barge limiting the movement of said guide plate to a swingingly reciprocatory motion so that said detent opens downwardly at its lower extreme position and upwardly at its upper extreme position, both to one side of a vertical centerline passing through said second pin.

4. In an apparatus having support means, a shaft carried by said support means, a rotatable pulley mounted on said shaft, and a cable trained over said pulley and having a fall and a hauling part, an improved latch means comprising in combination a swingingly reciprocable member pivoted on said shaft and provided with a detent and an adjacent guide surface both opening radially outwardly from said shaft; an arcuate link means having an upper and a lower end, the upper end being attached to the hauling part of said cable and the lower end being secured to a load; a pin extending through said upper end of said arcuate link means and mating with the guide surface and detent of said reciprocable member; and stop means located on said support means and limiting the movement of said reciprocable member to a swingingly reciprocatory motion with said detent at its upper extreme position opening upwardly vertically above said shaft and at its lower extreme position opening downwardly to one side of a vertical centerline passing through said shaft; a fixed spring seat carried on said support means concentric with said cable; and a spring means concentric with said rope bearing upon said spring seat and bearing upon said reciprocable member at its upper extreme position only, urging said reciprocable member to pivot away from said stop means.

5. An apparatus for operating a pair of dump-gates on a bottom-dump barge or the like, each arranged to pivot open about its rear edge by reason of its own weight comprising in combination a bridle assembly connected to the forward edge of each of said dump-gates and terminating in a first pin; winch means mounted on said barge; a cable interconnecting said first pin and said winch means; a second pin rigidly mounted horizontally on said barge; and a guide sheave pivoted on said second pin over which said cable trains, depending therefrom to said first pin; and a latch assembly for holding said dump-gates closed including a swingingly reciprocable guide plate pivoted on said second pin straddling said guide sheave and having a detent opening radially outwardly from said second pin aligned for operatively engaging said first pin, and stop means mounted on said barge limiting the movement of said guide plate to a swingingly reciprocatory motion so that said detent opens downwardly at its lower extreme position and upwardly at its upper extreme position both to one side of a vertical centerline passing through said second pin.

References Cited in the file of this patent

UNITED STATES PATENTS

| | | |
|---|---|---|
| 905,338 | Lobnitz | Dec. 1, 1908 |
| 1,065,328 | Zimmer | June 17, 1913 |
| 1,497,627 | Wilson et al. | June 10, 1924 |
| 1,609,179 | Marotte et al. | Nov. 30, 1926 |
| 2,197,237 | Campbell | Apr. 16, 1940 |
| 2,297,043 | Zimmerman | Sept. 29, 1942 |